United States Patent
Wang (10) Patent No.: US 11,948,088 B2
(45) Date of Patent: Apr. 2, 2024

(54) METHOD AND APPARATUS FOR IMAGE RECOGNITION

(71) Applicant: Nokia Technologies OY, Espoo (FI)

(72) Inventor: Tiancai Wang, Tianjin (CN)

(73) Assignee: Nokia Technologies OY, Espoo (FI)

( * ) Notice: Subject to any disclaimer, the term of this patent is extended or adjusted under 35 U.S.C. 154(b) by 723 days.

(21) Appl. No.: 17/050,636

(22) PCT Filed: May 14, 2018

(86) PCT No.: PCT/CN2018/086726
§ 371 (c)(1),
(2) Date: Oct. 26, 2020

(87) PCT Pub. No.: WO2019/218116
PCT Pub. Date: Nov. 21, 2019

(65) Prior Publication Data
US 2021/0097377 A1 Apr. 1, 2021

(51) Int. Cl.
*G06N 3/084* (2023.01)
*G06F 18/213* (2023.01)
*G06N 3/063* (2023.01)
*G06V 10/44* (2022.01)
*G06V 10/764* (2022.01)
*G06V 10/82* (2022.01)

(52) U.S. Cl.
CPC .......... *G06N 3/084* (2013.01); *G06F 18/213* (2023.01); *G06N 3/063* (2013.01); *G06V 10/454* (2022.01); *G06V 10/764* (2022.01); *G06V 10/82* (2022.01)

(58) Field of Classification Search
CPC ........ G06N 3/084; G06N 3/063; G06N 3/045; G06F 18/213; G06F 18/00; G06V 10/454; G06V 10/764; G06V 10/82
USPC .......................... 382/156, 159, 173, 181, 103
See application file for complete search history.

(56) References Cited

U.S. PATENT DOCUMENTS

| 2017/0220904 | A1  | 8/2017  | Bai et al. |         |
|--------------|-----|---------|------------|---------|
| 2019/0303742 | A1* | 10/2019 | Bonnell    | G06N 3/08 |
| 2020/0285934 | A1* | 9/2020  | Hinton     | G06N 3/09 |

FOREIGN PATENT DOCUMENTS

| CN | 104978586 A | 10/2015 |
| CN | 106548201 A | 3/2017  |

OTHER PUBLICATIONS

J. Hollosi and C. R. Pozna, "Improve the Accuracy of Neural Networks using Capsule Layers," 2018 IEEE 18th International Symposium on Computational Intelligence and Informatics (CINTI), Budapest, Hungary, 2018, pp. 000015-000018, doi: 10.1109/CINTI.2018.8928194. (Year: 2018).*

(Continued)

*Primary Examiner* — Kathleen Y Dulaney
(74) *Attorney, Agent, or Firm* — Harness, Dickey & Pierce, P.L.C.

(57) ABSTRACT

Method and apparatus are disclosed for image recognition. The method may include performing a vision task on an image by using a multi-scales capsules network, wherein the multi-scales capsules network includes at least two branches and an aggregation block, each of the at least two branches includes a convolution block, a primary capsules block and a transformation block, and a dimension of capsules of the primary capsules block in each of the at least two branches is different.

8 Claims, 5 Drawing Sheets

(56) References Cited

OTHER PUBLICATIONS

C. Xiang, L. Zhang, Y. Tang, W. Zou and C. Xu, "MS-CapsNet: A Novel Multi-Scale Capsule Network," in IEEE Signal Processing Letters, vol. 25, No. 12, pp. 1850-1854, Dec. 2018, doi: 10.1109/LSP.2018.2873892. (Year: 2018).*
Extended European Search Report dated Apr. 20, 2022 for corresponding European Application No. 18918669.5.
S. Sabour et al. 'Dynamic Routing Between Capsules' *31st Conference on Neural Information Processing Systems (NIPS)*, 2017, pp. 1-11.
J. Cao et al. 'Exploring Multi-Branch and High-Level Semantic Networks for Improving Pedestrian Detection' *IEEE*, Apr. 3, 2018 pp. 1-10.
M. Del Coco et al. 'Multi-branch CNN for Multi-scale Age Estimation' *Springer International Publishing AG*, 2017, pp. 234-244.
D. George et al. '3D mesh segmentation via multi-branch 1D convolutional neural networks' *Graphical Models*, 96, 2018, pp. 1-10.
International Search Report PCT/ISA/210 for International Application No. PCT/CN2018/086726 dated Jan. 28, 2019.
Max Pechyonkin, "Structure of Capsule Network", http://kuaibao.qq.com/s/20180223G0WZ7300?refer=cp_1026,Feb. 23, 2018 (Feb. 23, 2018).

* cited by examiner

> Performing a vision task on an image by using a multi-scales capsules network, wherein the multi-scales capsules network comprises at least two branches and an aggregation block, each of the at least two branches comprises a convolution block, a primary capsules block and a transformation block, and a dimension of capsules of the primary capsules block in each of the at least two branches is different — 702

802 — Optimizing parameters of the convolution block, the primary capsules block and the transformation block by using back-propagation

804 — Enhancing an image

806 — Performing a vision task on an image by using a multi-scales capsules network, wherein the multi-scales capsules network comprises at least two branches and an aggregation block, each of the at least two branches comprises a convolution block, a primary capsules block and a transformation block, and a dimension of capsules of the primary capsules block in each of the at least two branches is different

Fig.8

METHOD AND APPARATUS FOR IMAGE RECOGNITION

CROSS-REFERENCE TO RELATED APPLICATIONS

This application is a national phase under 35 U.S.C. § 371 of PCT International Application No. PCT/CN2018/086726 which has an International filing date of May 14, 2018, the entire contents of each of which are hereby incorporated by reference.

FIELD OF THE INVENTION

Embodiments of the disclosure generally relate to information technologies, and, more particularly, to image recognition.

BACKGROUND

Image recognition plays an important role in most applications. Image recognition systems are broadly used for various vision tasks such as gesture recognition, face recognition, hand-written character recognition. As an example, image recognition systems can be used in video surveillance, traffic surveillance, driver assistant systems, autonomous vehicle, traffic monitoring, human identification, human-computer interaction, public security, event detection, tracking, frontier guards and the Customs, scenario analysis and classification, image indexing and retrieve, etc. Convolutional Neural Networks (CNNs) has achieved state-of-the-art performance in image recognition. A property of CNNs is that it can keep invariance, which means that it can detect objects no matter where the objects locate in the image. However, a property for a deep learning model, named "equivariance", is to transform the content of object to retain the information, which CNNs fail to achieve.

Figure 1:
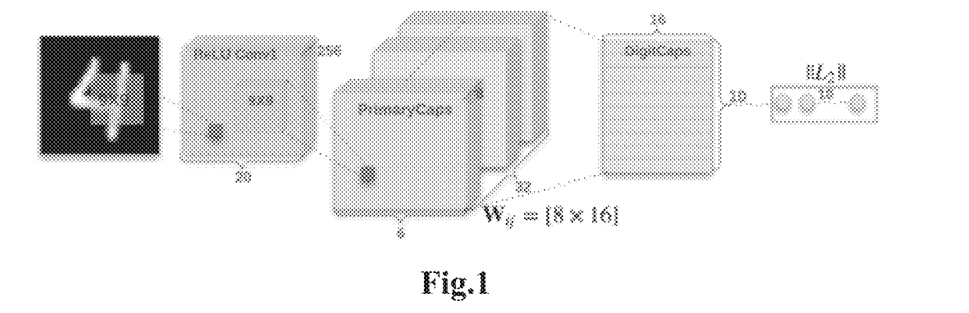
FIG. 1 shows architecture of CapsNet.
Figure 2:
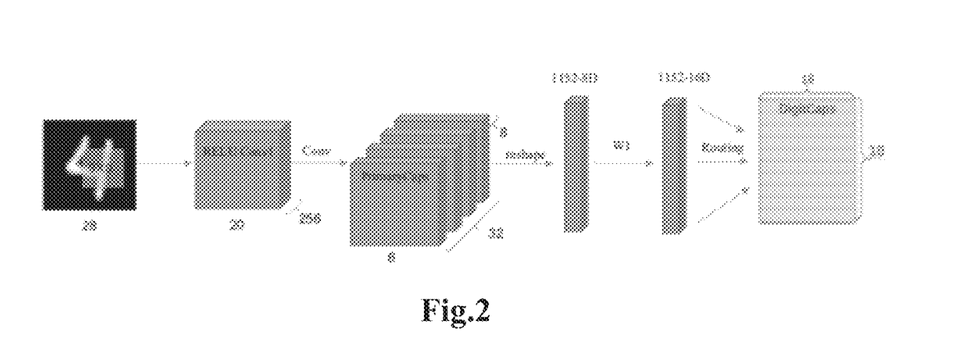
FIG. 2 shows the detailed frame of CapsNet.

At the end of 2017, Geoffrey E Hinton at Google Brain proposed a new architecture named CapsNet in a paper "Sara Sabour, Nicholas Frosst, and Geffrey E. Hinton, Dynamic Routing Between Capsules, in Annual Conference on Neural Information Processing Systems, 2017" to achieve equivariance, which is incorporated herein by reference in its entirety. As shown in FIG. 1, CapsNet only has two convolutional layers and one fully connected layer. FIG. 2 shows the detailed frame of CapsNet. RELU Conv1 layer attempts to obtain rich features with big receptive field. PrimaryCaps layer focuses on constructing initial capsules and DigitCaps are obtained through affine transformation and dynamic routing mechanism successively. A capsule is a group of neurons whose activity vector represents the instantiation parameters of a specific type of entity such as an object or an object part. The length and orientation of the activity vector denotes a probability that an entity exists and the instantiation parameters of the entity, respectively. CapsNet can be applied to various vision tasks, such as image classification, object detection and semantic segmentation.

SUMMARY

The advantages of CapsNet are that it can compress features of input images into a k-dimension digit capsule with the help of routing-by-agreement mechanism and the optimization process is supervised by a reconstruction method. However, in PrimaryCaps layer, the dimension of primary capsules is fixed, which makes digit capsule fails to represent or adapt various objects. The single scale of primary capsules restricts the performance of CapsNet on various vision tasks. It may be beneficial for objects with different complexity to be constructed to the primary capsules with different dimensions. Currently, multi-scale strategy mainly focuses on CNNs architecture. CapsNet has not considered introducing the multi-scale strategy to enhance feature representation.

To overcome or mitigate the above-mentioned problem or other problems, the embodiments of the disclosure propose a multi-scales capsules network which can be applied to various vision tasks, such as image classification, object detection and semantic segmentation. The proposed multi-scales capsules network adopts multi-scale strategy to introduce various capsule dimensions to compress the feature information of different target objects. The multi-scale strategy in the proposed multi-scales capsules network is obviously different from those in CNNs. The multi-scale in the proposed multi-scales capsules network is reflected in capsules' dimension while the multi-scale in CNNs is reflected in the height and weight of the feature maps.

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to an aspect of the present disclosure, it is provided a method. The method may comprise performing a vision task on an image by using a multi-scales capsules network. The multi-scales capsules network may comprise at least two branches and an aggregation block, each of the at least two branches comprises a convolution block, a primary capsules block and a transformation block, and a dimension of capsules of the primary capsules block in each of the at least two branches is different.

In an embodiment, the vision task comprises at least one of image classification, object detection and semantic segmentation.

In an embodiment, the vision task is image classification and performing a vision task on an image by using the multi-scales capsules network may comprise, for each of the at least two branches, obtaining first feature maps of the image by using a number of convolution kernels, wherein the number of convolution kernels for different branches is different; decreasing, by using a convolution operation, a scale of the first feature maps to obtain second feature maps; reshaping the second feature maps to multiple capsule channels; reshaping the multiple capsule channels to multiple capsules, wherein a dimension of the capsules for different branches is different; performing affine transformation on the multiple capsules to obtain first vote capsules such that a dimension of the first vote capsules for different branches is same; concatenating the first vote capsules of the at least two branches together to obtain second vote capsules; for each of a predefined number of image classes, performing dynamic routing on the second vote capsules to obtain respective weights of the second vote capsules; obtaining a weighted sum of the second vote capsules; and determining a category corresponding to a top length of the obtained weighted sums as a category of the image.

In an embodiment, a number of the capsule channels in each of the at least two branches is set to an identical integer.

In an embodiment, the method further comprises optimizing parameters of the convolution block, the primary capsules block and the transformation block by using backpropagation.

In an embodiment, the parameters comprise the convolution kernels in the convolution block and the primary capsules block and affine transformation matrixes in the transformation block.

In an embodiment, the method further comprises enhancing the image.

According to another aspect of the disclosure, it is provided an apparatus. The apparatus may comprise at least one processor; and at least one memory including computer program code, the memory and the computer program code configured to, working with the at least one processor, cause the apparatus to perform a vision task on an image by using a multi-scales capsules network. The multi-scales capsules network may comprise at least two branches and an aggregation block, each of the at least two branches comprises a convolution block, a primary capsules block and a transformation block, and a dimension of capsules of the primary capsules block in each of the at least two branches is different.

According to still another aspect of the present disclosure, it is provided a computer program product embodied on a distribution medium readable by a computer and comprising program instructions which, when loaded into a computer, causes a processor to perform a vision task on an image by using multi-scales capsules network. The multi-scales capsules network may comprise at least two branches and an aggregation block, each of the at least two branches comprises a convolution block, a primary capsules block and a transformation block, and a dimension of capsules of the primary capsules block in each of the at least two branches is different.

According to still another aspect of the present disclosure, it is provided a non-transitory computer readable medium having encoded thereon statements and instructions to cause a processor to perform a vision task on an image by using a multi-scales capsules network. The multi-scales capsules network may comprise at least two branches and an aggregation block, each of the at least two branches comprises a convolution block, a primary capsules block and a transformation block, and a dimension of capsules of the primary capsules block in each of the at least two branches is different.

According to still another aspect of the present disclosure, it is provided an apparatus comprising means configured to perform a vision task on an image by using a multi-scales capsules network. The multi-scales capsules network may comprise at least two branches and an aggregation block, each of the at least two branches comprises a convolution block, a primary capsules block and a transformation block, and a dimension of capsules of the primary capsules block in each of the at least two branches is different.

These and other objects, features and advantages of the disclosure will become apparent from the following detailed description of illustrative embodiments thereof, which is to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement. Various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

It is noted that though the embodiments are mainly described in the context of image classification, they are not limited to this but can be applied to various vision tasks that can benefit from the embodiments as described herein.

Figure 3:
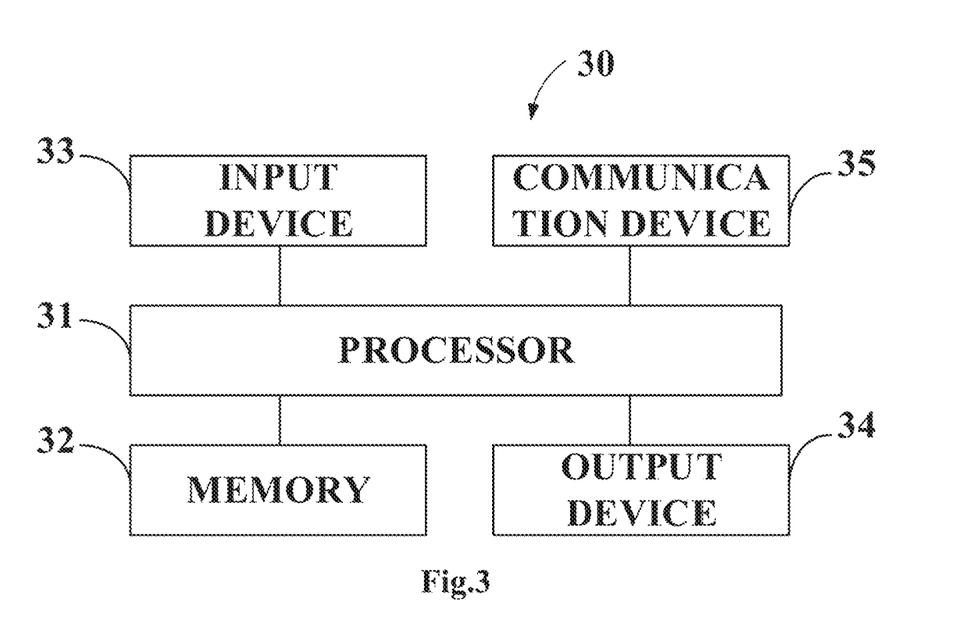
FIG. 3 is a simplified block diagram showing an apparatus in which various embodiments of the disclosure may be implemented.

FIG. 3 is a simplified block diagram showing an apparatus, such as an electronic apparatus 30, in which various embodiments of the disclosure may be applied. It should be understood, however, that the electronic apparatus as illustrated and hereinafter described is merely illustrative of an apparatus that could benefit from embodiments of the disclosure and, therefore, should not be taken to limit the scope of the disclosure. While the electronic apparatus 30 is illustrated and will be hereinafter described for purposes of example, other types of apparatuses may readily employ embodiments of the disclosure. The electronic apparatus 30 may be a user equipment, a mobile computer, a desktop computer, a laptop computer, a mobile phone, a smart phone, a tablet, a server, a cloud computer, a virtual server, a computing device, a distributed system, a video surveillance apparatus, and/or any other types of electronic systems. The electronic apparatus 30 may run with any kind of operating system including, but not limited to, Windows, Linux, UNIX, Android, iOS and their variants. Moreover, the apparatus of at least one example embodiment need not to be the entire electronic apparatus, but may be a component or group of components of the electronic apparatus in other example embodiments.

In an embodiment, the electronic apparatus 30 may comprise processor 31 and memory 32. Processor 31 may be any type of processor, controller, embedded controller, processor core, graphics processing unit (GPU) and/or the like. In at least one example embodiment, processor 31 utilizes computer program code to cause an apparatus to perform one or more actions. Memory 32 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 32 may store any of a number of pieces of information, and data. The information and data may be used by the electronic apparatus 30 to implement one or more functions of the electronic apparatus 30, such as the functions described herein. In at least one example embodiment, memory 32 includes computer program code such that the memory and the computer program code are configured to, working with the processor, cause the apparatus to perform one or more actions described herein.

The electronic apparatus 30 may further comprise a communication device 35. In at least one example embodiment, communication device 35 comprises an antenna, (or multiple antennae), a wired connector, and/or the like in operable communication with a transmitter and/or a receiver. In at least one example embodiment, processor 31 provides signals to a transmitter and/or receives signals from a receiver. The signals may comprise signaling information in accordance with a communications interface standard, user speech, received data, user generated data, and/or the like. Communication device 35 may operate with one or more air interface standards, communication protocols, modulation types, and access types. By way of illustration, the electronic communication device 35 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 35 may operate in accordance with wireline protocols, such as Ethernet, digital subscriber line (DSL), and/or the like.

Processor 31 may comprise means, such as circuitry, for implementing audio, video, communication, navigation, logic functions, and/or the like, as well as for implementing embodiments of the disclosure including, for example, one or more of the functions described herein. For example, processor 31 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 30 among these devices according to their respective capabilities. The processor 31 thus may comprise the functionality to encode and interleave message and data prior to modulation and transmission. The processor 31 may additionally comprise an internal voice coder, and may comprise an internal data modem. Further, the processor 31 may comprise functionality to operate one or more software programs, which may be stored in memory and which may, among other things, cause the processor 31 to implement at least one embodiment including, for example, one or more of the functions described herein. For example, the processor 31 may operate a connectivity program, such as a conventional internet browser. The connectivity program may allow the electronic apparatus 30 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 30 may comprise a user interface for providing output and/or receiving input. The electronic apparatus 30 may comprise an output device 34. Output device 34 may comprise an audio output device, such as a ringer, an earphone, a speaker, and/or the like. Output device 34 may comprise a tactile output device, such as a vibration transducer, an electronically deformable surface, an electronically deformable structure, and/or the like. Output Device 34 may comprise a visual output device, such as a display, a light, and/or the like. The electronic apparatus may comprise an input device 33. Input device 33 may comprise a light sensor, a proximity sensor, a microphone, a touch sensor, a force sensor, a button, a keypad, a motion sensor, a magnetic field sensor, a camera, a removable storage device and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic apparatus 30 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

Input device 33 may comprise an image capturing element. The image capturing element may be any means for capturing an image(s) for storage, display or transmission. For example, in at least one example embodiment, the image capturing element is an imaging sensor. As such, the image capturing element may comprise hardware and/or software necessary for capturing the image. In addition, input device 33 may comprise any other elements such as a camera module.

Figure 4:
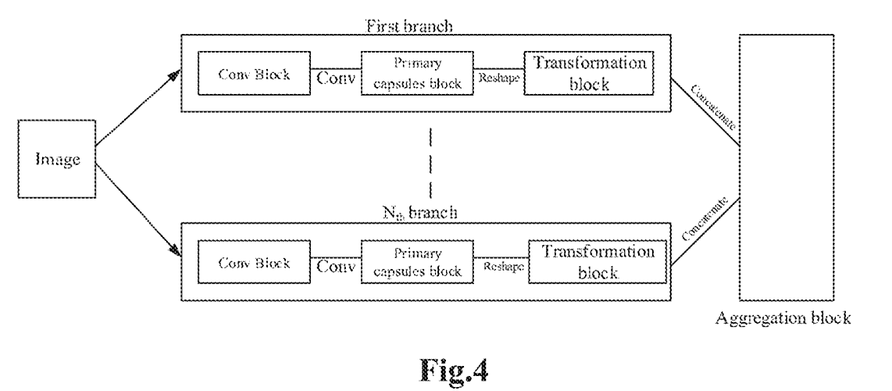
FIG. 4 schematically shows an architecture of a multi-scales capsules network according to an embodiment of the present disclosure.

FIG. 4 schematically shows architecture of the multi-scales capsules network according to an embodiment of the present disclosure. As described above, the capsules network only considers primary capsule of single-dimension, which make it difficult for a detector to adapt objects with different complexity. The multi-scales capsules network adopts multi-scale strategy to introduce various capsule dimensions to compress the feature information of different target objects. The multi-scales capsules network may comprise at least two branches and an aggregation block. Each of the at least two branches may comprise a convolution block (Conv Block), a primary capsules block and a transformation block. The dimension of capsules of the primary capsules block in each of the at least two branches is different. The proposed multi-scales strategy may be represented by primary capsules with different dimensions in the primary capsules block according to different construction of feature channels in the convolution block. The convolution block may be configured to obtain feature maps of the image. The primary capsules block may be configured to generate multiple capsule channels by performing a convolution operation on the first feature maps and grouping operation on output neurons. For example, multiple output neurons may be grouped together to form a capsule. The transformation block may be configured to perform dimension transformation of capsules. The aggregation block may be configured to concatenate the capsules of each branch together to obtain vote capsules and perform a clustering algorithm either currently known or to be developed in the future that can be used in the capsules network, such as the dynamic routing algorithm as described in the paper "Sara Sabour, Nicholas Frosst, and Geffrey E. Hinton, Dynamic Routing Between Capsules, in Annual Conference on Neural Information Processing Systems, 2017". The functionalities of the convolution block, the primary capsules block, the transformation block and the aggregation block may be similar to those of the RELU Conv1 layer, PrimaryCaps layer, affine transformation and dynamic routing mechanism of CapsNet respectively. In addition, the functionalities of the convolution block, the primary capsules block and the transformation block may be implemented by using any suitable technologies either currently known or to be developed in the future. The number of the branches may be predefined, depending on a specific vision task, or determined by machine learning, etc. The dimension of capsules in each of the at least two branches may be predefined, depending on the specific vision task, or determined by machine learning, etc. The convolution kernels used in the convolution block and the primary capsules block may be predefined, depending on a specific vision task, or determined by machine learning, etc. Moreover, there may be one or more additional convolutional blocks supporting capsules following the primary capsules block in the multi-scales capsules network.

Figure 5:
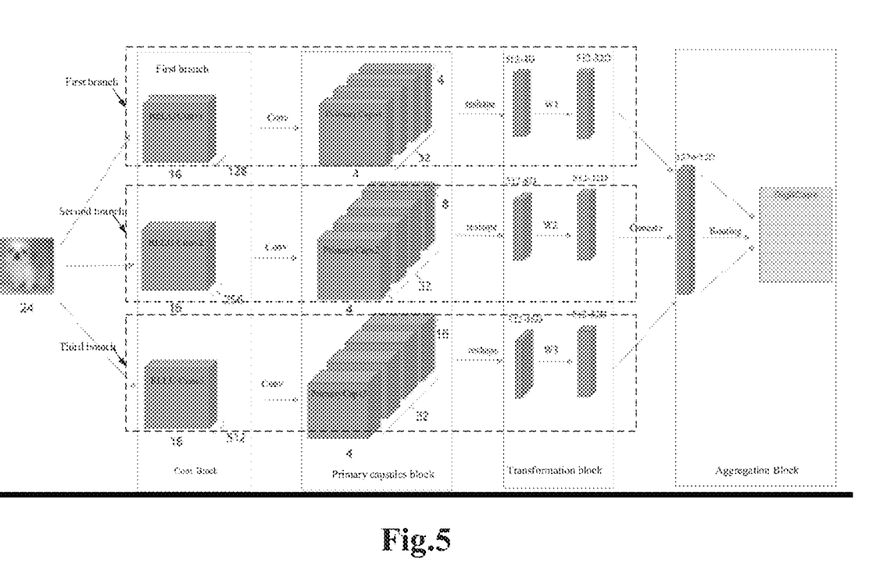
FIG. 5 schematically shows an architecture of a multi-scales capsules network on CIFAR10 dataset according to an embodiment of the present disclosure.

FIG. 5 schematically shows an example of the multi-scales capsules network on CIFAR10 dataset. The CIFAR10 dataset may be accessed from https://www.cs.toronto.edu/~kriz/cifar.html. As shown in FIG. 5, after enhancement of the input image, the size of input image may be set to 24*24. Through different 9*9 convolution kernels with a stride of 1, Conv Blocks (Conv1, Conv2, Conv3) in three branches obtain 128, 256 and 512 feature maps, respectively.

Through further convolution operation with a stride of 2, the scale of feature maps continues to decrease. Then three kinds of feature maps are reshaped to 32 capsule channels and the dimensions (D) of capsules in three branches are 4, 8 and 16, respectively. Different kinds of capsules may be used to represent various objects with different complexity.

The 32 capsule channels in three branches are reshaped to 512 different dimension vectors, which means there are 512 capsules in each branch and the difference between these three branches is the dimension of capsule. The 512 capsules in three branches pass through three different affine transformation matrixes (4→32, 8→32, 16→32) to obtain 512 32D vote capsules, which aims to make primary capsules to adapt different viewpoints in vision task. The 512 32D vote capsules of three branches are different because the multi-scale representation of primary capsules in primary capsules Block.

Then the 512 32D vote capsules of three branches are concatenated together to obtain 1536 32D vote capsules to participate in voting for digit capsules in the aggregation block.

Through dynamic routing, the 1536 32D vote capsules may be given corresponding weight at the last iteration and the digit capsule of each image class is a weighted sum over 1536 32D vote capsules.

Figure 6:
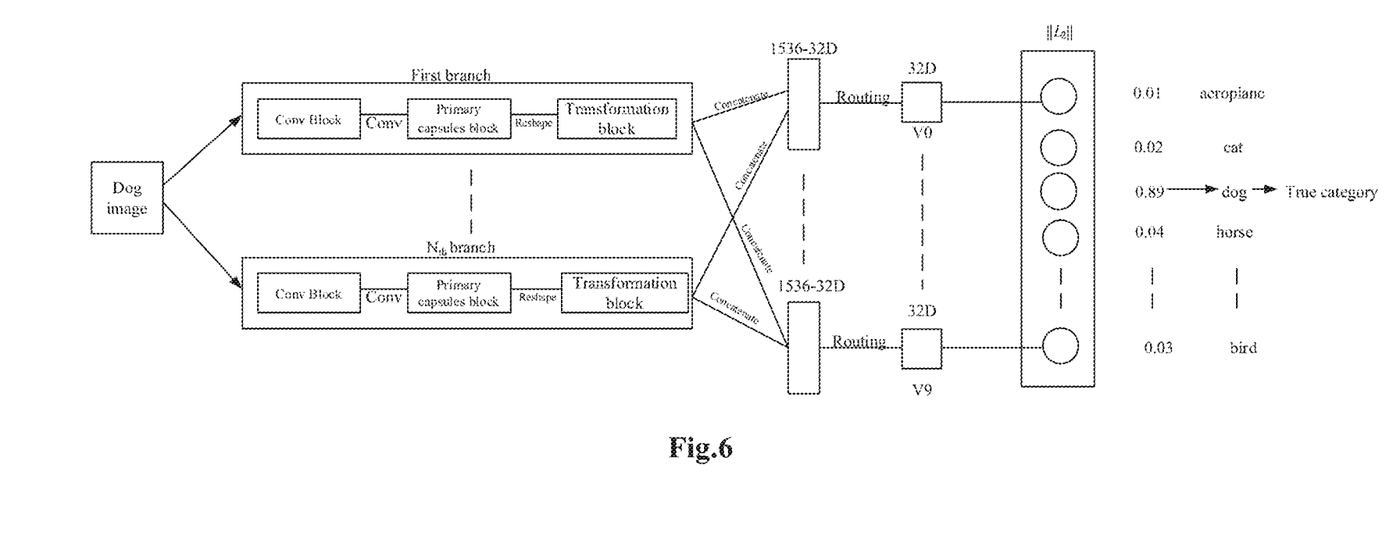
FIG. 6 schematically shows multi-scales capsules network architecture for image classification task according to an embodiment of the present disclosure.

FIG. 6 schematically shows multi-scales capsules network architecture for image classification task on CIFAR10 dataset. As shown in FIG. 6, the image such as a dog image is put into multi-scales capsules network architecture, goes through at least two branches and at last obtains ten digit capsules. As mentioned above, the length of capsule vector denotes the probability one entity/object exists. Hence, the category corresponding to the top length of the capsule vector may be determined as the category of the input image. In this embodiment, the category, i.e., dog, corresponding to the top length, i.e., 0.89, of the capsule vector may be determined as the category of the input image.

Figure 7:
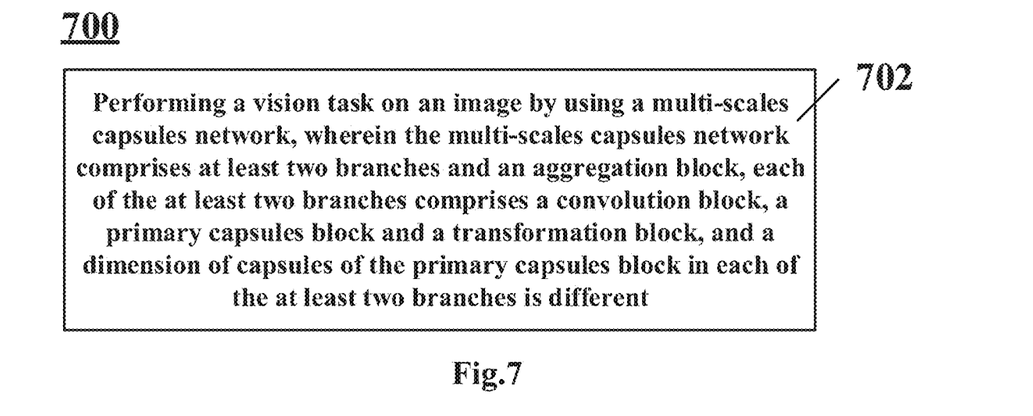
FIG. 7 is a flow chart depicting a method according to an embodiment of the present disclosure.

FIG. 7 is a flow chart depicting a method according to an embodiment of the present disclosure. The method 700 may be performed at an apparatus such as the electronic apparatus 30 of FIG. 3. As such, the apparatus may provide means for accomplishing various parts of the method 700 as well as means for accomplishing other processes in conjunction with other components. For some same or similar parts which have been described with respect to FIGS. 1-6, the description of these parts is omitted here for brevity.

As shown in FIG. 7, the method 700 may start at block 702 where the electronic apparatus 30 may perform a vision task on an image by using a multi-scales capsules network such as the multi-scales capsules network. The multi-scales capsules network may comprise at least two branches and an aggregation block. Each of the at least two branches may comprise a convolution block, a primary capsules block and a transformation block. A dimension of capsules of the primary capsules block in each of the at least two branches is different.

The vision task may comprise at least one of image classification, object detection and semantic segmentation or any other suitable vision task which can benefit from the embodiments as described herein.

As described above, the number of the branches may be predefined, depending on the specific vision task, or determined by machine learning, etc. The dimension of capsules in each of the at least two branches may be predefined, depending on the specific vision task, or determined by machine learning, etc.

In an embodiment, the vision task is image classification and performing a vision task on an image by using the multi-scales capsules network comprises: for each of the at least two branches, obtaining first feature maps of the image by using a number of convolution kernels, wherein the number of convolution kernels for different branches is different. The number of convolution kernels for different branches may be predefined, depending on the specific vision task, or determined by machine learning, etc. For example, as shown in FIG. 5, the first, second and third branches may use 128, 256 and 512 convolution kernels with a stride of 1 respectively.

Then a scale of the first feature maps may be decreased by using a convolution operation to obtain second feature maps. For example, as shown in FIG. 5, through further convolution operation with a stride of 2, the scale of the first feature maps continues to decrease.

Then the second feature maps may be reshaped to multiple capsule channels. For example, three kinds of the second feature maps are reshaped to 32 capsule channels and the dimensions of capsules in three branches are 4, 8 and 16, respectively. Different kinds of capsules may be used to represent various objects with different complexity.

The multiple capsule channels in each branch are reshaped to multiple capsules, wherein a dimension of the capsules for different branches is different. For example, the 32 capsule channels in three branches are reshaped to 512 different dimension vectors, which means there are 512 capsules in each branch and the difference between these three branches is the dimension of each capsule as shown in FIG. 5.

Then affine transformation is performed on the multiple capsules to obtain first vote capsules such that a dimension of the first vote capsules for different branches is same. For example, the 512 capsules in three branches pass through three different affine transformation matrixes (4→32, 8→32, 16→32) to obtain 512 32D vote capsules, which aims to make primary capsules to adapt different viewpoints in vision task as shown in FIG. 5.

The first vote capsules of the at least two branches are concatenated together to obtain second vote capsules. For example, the 512 32D vote capsules of three branches are concatenated together to obtain 1536 32D vote capsules to participate in voting for digit capsules in the aggregation block as shown in FIG. 5.

For each of a predefined number of image classes, dynamic routing is performed on the second vote capsules to obtain respective weights of the second vote capsules and then a weighted sum of the second vote capsules are obtained. For example, through dynamic routing, the 1536 32D vote capsules may be given corresponding weight at the last iteration and the digit capsule of each image class is a weighted sum over 1536 32D vote capsules as shown in FIG. 6.

Finally, a category corresponding to a top length of the obtained weighted sums may be determined as a category of the image. For example, the category of input image may be determined as a dog as shown in FIG. 6.

In an embodiment, a number of the capsule channels in each of the at least two branches is set to an identical integer. For example, the number of the capsule channels in each branch is set to 32 as shown in FIG. 5. It is noted that the number of the capsule channels in each branch may be set to any other suitable integer in other embodiments.

Figure 8:
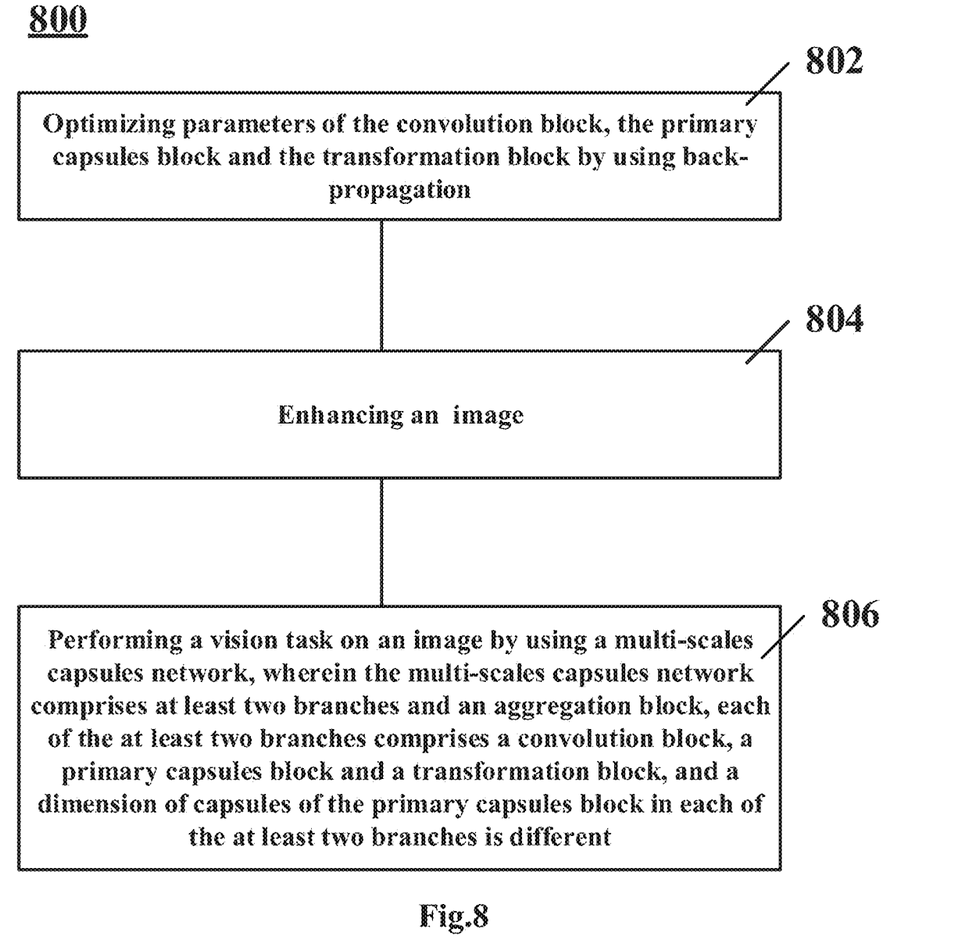
FIG. 8 is a flow chart depicting a method according to another embodiment of the present disclosure.

FIG. 8 is a flow chart depicting a method according to another embodiment of the present disclosure. The method 800 may be performed at an apparatus such as the electronic apparatus 30 of FIG. 3. As such, the apparatus may provide means for accomplishing various parts of the method 800 as well as means for accomplishing other processes in conjunction with other components. For some same or similar parts which have been described with respect to FIGS. 1-7, the description of these parts is omitted here for brevity. Block 806 is similar to block 702 of FIG. 7, therefore the description of this step is omitted here for brevity.

As shown in FIG. 8, the method 800 may start at block 802 where the electronic apparatus 30 may optimize parameters of the convolution block, the primary capsules block and the transformation block by using back-propagation. The parameters may comprise any suitable parameters. In an embodiment, the parameters may comprise the convolution kernels in the convolution block and the primary capsules block and affine transformation matrixes in the transformation block.

At block 804, the electronic apparatus 30 may enhance the image. For example, image enhancement may comprise removing noise, sharpening, or brightening the image, making the image easier to identify key features, etc.

The advantages of embodiments of the disclosure are as follows. The CapsNet only use single-dimension capsule to compress and store object information, which is not reasonable to adapt objects with different complexity. The embodiments of the disclosure introduce multi-scale strategy to the capsules network to represent various objects. Also, the multi-scale strategy is obviously different from the one in CNNs since the multi-scale in multi-scales capsules network is reflected in capsules' dimension while the multi-scale in CNNs is reflected in the height and weight of the feature maps. In this way, multi-scales capsules network can obtain both local and global semantic information to improve the performance in vision task. The Mnist dataset, affNIST dataset, smallNORB dataset, CIFAR10 dataset and SVHN dataset are used for comparing the proposed multi-scales capsules network with the CapsNet. The results are given in Table 1 where one can see the significant superiority of the proposed multi-scales capsules network.

TABLE 1

Error rates (%) of the CapsNet and the multi-scales capsules network

| Method | Mnist | affNIST | smallNORB | CIFAR 10 | SVHN |
|---|---|---|---|---|---|
| CapsNet | 0.25 | 21 | 2.7 | 10.6 | 4.3 |
| Multi-scales capsules network | 0.23 | 17 | 1.9 | 9.4 | 3.8 |

It is noted that any of the components of the apparatus described above can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

Additionally, an aspect of the disclosure can make use of software running on a general purpose computer or workstation. Such an implementation might employ, for example, a processor, a memory, and an input/output interface formed, for example, by a display and a keyboard. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. The processor, memory, and input/output interface such as display and keyboard can be interconnected, for example, via bus as part of a data processing unit. Suitable interconnections, for example via bus, can also be provided to a network interface, such as a network card, which can be provided to interface with a computer network, and to a media interface, such as a diskette or CD-ROM drive, which can be provided to interface with media.

Accordingly, computer software including instructions or code for performing the methodologies of the disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

As noted, aspects of the disclosure may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the disclosure may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

The flowchart and block diagrams in the figures illustrate the architecture, functionality, and operation of possible implementations of apparatus, methods and computer program products according to various embodiments of the disclosure. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

In any case, it should be understood that the components illustrated in this disclosure may be implemented in various forms of hardware, software, or combinations thereof, for example, application specific integrated circuit(s) (ASICS), a functional circuitry, a graphics processing unit, an appropriately programmed general purpose digital computer with associated memory, and the like. Given the teachings of the disclosure provided herein, one of ordinary skill in the related art will be able to contemplate other implementations of the components of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method comprising:
performing a vision task on an image by using a multi-scales capsules network,
wherein the multi-scales capsules network comprises at least two branches and an aggregation block, each of the at least two branches comprises a convolution block, a primary capsules block and a transformation block, and a dimension of capsules of the primary capsules block in each of the at least two branches is different, and
wherein the vision task comprises at least one of image classification, object detection and semantic segmentation.

2. The method according to claim 1, wherein the vision task is image classification and performing the vision task on the image by using the multi-scales capsules network comprises:
for each of the at least two branches,
obtaining first feature maps of the image by using a number of convolution kernels, wherein the number of convolution kernels for different branches is different;
decreasing, by using a convolution operation, a scale of the first feature maps to obtain second feature maps;
reshaping the second feature maps to multiple capsule channels;
reshaping the multiple capsule channels to multiple capsules, wherein a dimension of the multiple capsules for different branches is different;
performing affine transformation on the multiple capsules to obtain first vote capsules such that a dimension of the first vote capsules for different branches is same;
concatenating the first vote capsules of the at least two branches together to obtain second vote capsules;
for each of a predefined number of image classes,
performing dynamic routing on the second vote capsules to obtain respective weights of the second vote capsules;
obtaining a weighted sum of the second vote capsules; and
determining a category corresponding to a top length of the obtained weighted sum as a category of the image.

3. The method according to claim 2, wherein a number of the multiple capsule channels in each of the at least two branches is set to an identical integer.

4. The method according to claim 1, further comprising:
optimizing parameters of the convolution block, the primary capsules block and the transformation block by using back-propagation.

5. The method according to claim 4, wherein the parameters comprise convolution kernels in the convolution block and the primary capsules block and affine transformation matrixes in the transformation block.

6. The method according to claim 1, further comprising enhancing the image.

7. An apparatus, comprising:
at least one processor; and
at least one memory including computer program code, the memory and the computer program code configured to, working with the at least one processor, cause the apparatus to
perform a vision task on an image by using a multi-scales capsules network,
wherein the multi-scales capsules network comprises at least two branches and an aggregation block, each of the at least two branches comprises a convolution block, a primary capsules block and a transformation block, and a dimension of capsules of the primary capsules block in each of the at least two branches is different, and
wherein the vision task comprises at least one of image classification, object detection and semantic segmentation.

8. A non-transitory computer readable medium having encoded thereon statements and instructions, which when executed by a processor, cause the processor to perform the method according to claim 1.

* * * * *